April 5, 1949.   J. R. SCHOENBAUM ET AL   2,466,560
FREQUENCY CHANGER
Filed May 12, 1945
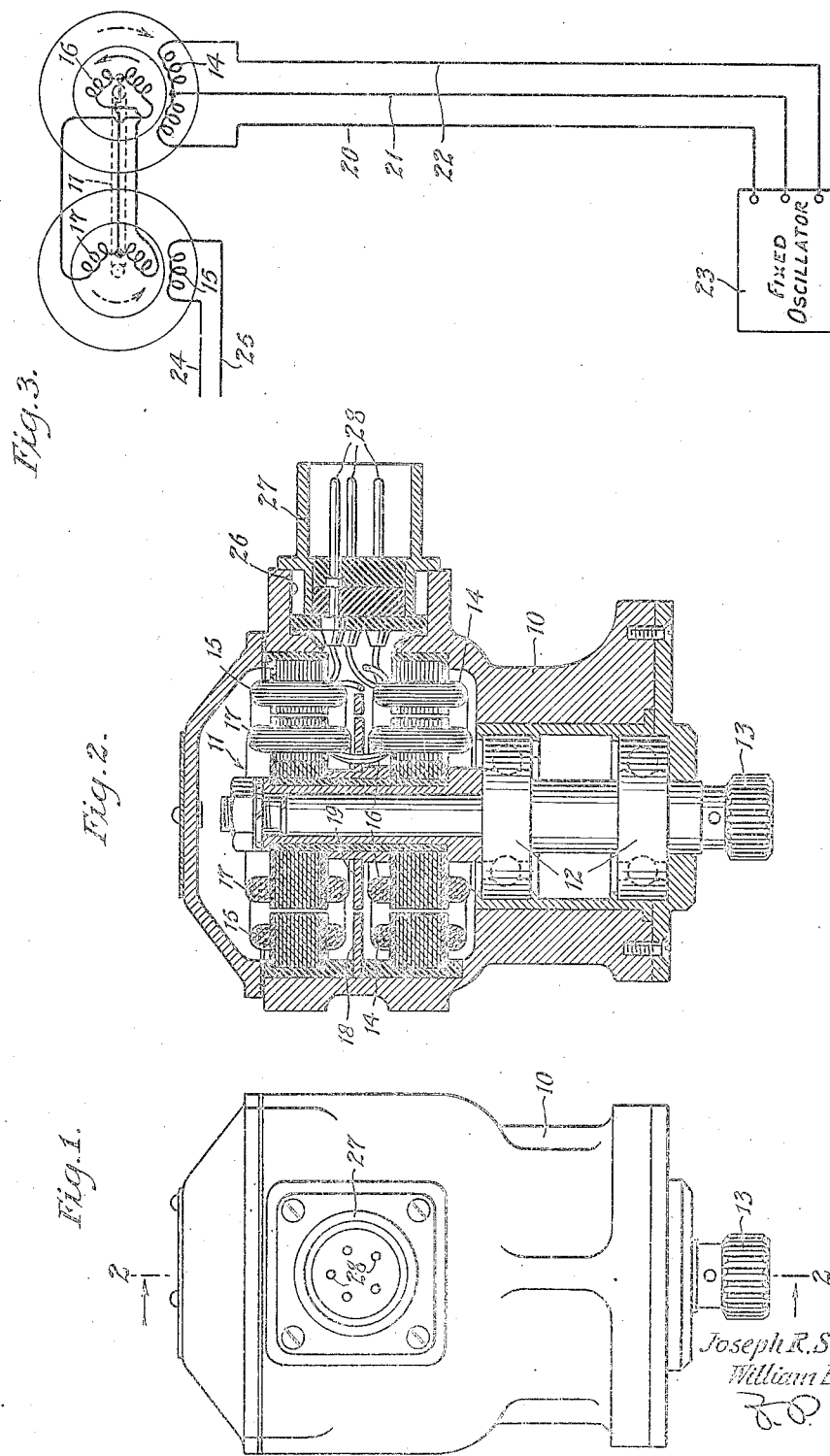
Inventors
Joseph R. Schoenbaum
William H. Clark Jr.
Attorney Patented Apr. 5, 1949

2,466,560

UNITED STATES PATENT OFFICE 2,466,560

FREQUENCY CHANGER

Joseph R. Schoenbaum, Roseland, and William H. Clark, Jr., Rutherford, N. J., assignors to Curtiss-Wright Corporation, a corporation of Delaware Application May 12, 1945, Serial No. 593,523

2 Claims. (Cl. 172—281)

This invention relates to improvements in frequency changers, being characterized by features which adapt it particularly, although not necessarily, for modulating carrier frequencies to produce single side band modulations.

One object of the invention is to provide a frequency changer wherein variations in the mechanical driving frequency, throughout the range contemplated, involve only small percentage changes in the output frequency instead of a direct relationship, whereby to enable associated detection systems to function with much narrower selective channels than would otherwise be possible.

A further object is to provide a frequency changer which is so constructed and wired that a high frequency with respect to the shaft rotational frequency may be obtained while, at the same time, slip rings or other mechanical connections and accessory equipment are rendered unnecessary.

Other objects will be apparent from a reading of the specification herein when considered in connection with the accompanying drawing.

The invention is illustrated in the accompanying drawing, in which:

Figure 1 is a side elevation of a frequency changer embodying the features of the invention;

Figure 2 is a vertical sectional view taken along line 2—2 of Figure 1; and

Figure 3 is a wiring diagram of the frequency changer.

The frequency changer may be utilized to particular advantage in connection with governing and/or synchronizing systems for engine-propeller combinations of aircraft and other control systems which involve the generation of a signal having a frequency which corresponds to, and which varies directly as, the instantaneous speed of an engine-propeller combination, the signal frequency being combined, or compared, with a reference frequency to produce a voltage or current having a magnitude which is the function of the difference between the signal frequency and the reference frequency and such voltage or current being utilized to effect any necessary corrections in the speed of the prime mover.

As illustrated, the frequency changer includes a housing 10 in which a rotor 11 is mounted in bearings 12. An extension on the rotor shaft carries the driven gear 13 of the gearing by which the frequency changer is connected to the drive shaft of the engine-propeller combination, assuming the frequency changer to be employed for the specific purpose noted. Two stator windings are employed, namely, a two-phase input winding 14 and a single-phase output winding 15, both having the same number of poles. The rotor includes a two-phase winding 16 which is located within the stator winding 14 and a two-phase winding 17 which is located within the winding 15 and connected in reverse phase rotation to the winding 16, the rotor windings having the same number of poles as the stator windings. Preferably, the windings 14 and 16 and 15 and 17 are magnetically shielded from one another, the stator carrying an annular shield 18 and the rotor carrying a cooperating shield 19 for this purpose. The inner shield, although turning within the outer shield, cooperates with the latter to provide a substantially continuous wall.

In accordance with the invention, the stator winding 14 is excited by a multi-phase signal having a predetermined frequency; and to this end the said winding is connected by lines 20, 21 and 22 to a two-phase oscillator 23 having a predetermined constant output frequency. The rotor is driven in a direction counter to the direction of rotation of the multi-phase field of the winding 14, the direction of rotation of the rotor being indicated by the arrow in solid lines and the direction of rotation of the electric fields being indicated by the arrows in dotted lines. A poly-phase signal having a frequency equal to the input frequency plus the number of pairs of poles times the rotational speed of the rotor in R. P. M. is, therefore, produced in the rotor winding 16. The latter, as shown, is connected to the winding 17 so that the phases are reversed. Hence a frequency in cycles per second will be produced in the stator winding 15 which is equal to the input frequency plus the number of fields times N times the speed of rotation in R. P. S. of the rotor, N representing the number of pairs of poles per field, or frequency output equals frequency input plus 2N (R. P. S.) for the construction illustrated. A signal will thus be produced in the output winding 15 of the modulator having a frequency which varies as a function of the speed of the drive shaft of the engine-propeller combination, the output lines being indicated at 24 and 25. It should be understood that the number of fields is not limited to two, but that any number may be used in combination as desired.

In order to provide for facility in making the necessary electrical connections to the input and output windings of the stator, the housing 10 is formed with a window 26 for accommodating a receptacle 27. The five pins 28 of the latter provide three connections for the input winding 14 while the two remaining pins provide the connections for the output winding 15.

The modulator described has the advantage that relatively high frequencies may be produced with a minimum number of poles per stator-rotor combination and without the aid of slip rings or other types of mechanical connections and without the aid of accessory equipment. A further advantage obtained is that variations in the output frequency of the modulator as a result of variations in the speed of the engine-propeller combination throughout the range contemplated, involve only small percentage changes in the output frequency instead of a direct relationship. For example, with a modulation carrier of 5,000 C. P. S., assuming 40–400 C. P. S. to represent a change of from 300–3000 R. P. M. in the speed of an engine-propeller combination (derived from $2N \times R. P. S.$ where $N=4$), it will be apparent that 5040–5400 C. P. S., which covers the entire speed range band width, will involve a change of less than 8 per cent. in the output frequency. Hence detection systems may be operated with much narrower selective channels than would otherwise be possible without possibility of any of the output frequencies involved bearing an integral multiple relation with respect to one another.

Although the frequency changer has been described in connection with the modulation of relatively high carriers for a specific purpose, it is to be understood that this is intended by way of example only and that the advantages of the invention may be likewise obtained in the power field as a converter and in other fields and for other purposes.

What is claimed as new and desired to be secured by Letters Patent, is:

1. A frequency changer including a stator having a multiphase input winding which is adapted to be excited by a multiphase signal of predetermined frequency and an output winding, and a rotor having a plurality of multiphase windings, one of which is excited by said input winding and another of which excites said output winding, means connecting said rotor windings in reverse, means for exciting said input winding at a constant frequency, and means for driving said rotor in opposition to the phase rotation of the signal frequency in the input winding at a variable speed to produce a low frequency variation in the output winding in response to widely varying speed.

2. A frequency changer including a stator having a multiphase input winding which is adapted to be excited by a multi-phase signal of predetermined frequency and a single-phase output winding, and a rotor having a plurality of multi-phase windings, said rotor windings being reversely connected and one being excited by said input winding and the other exciting said output winding and variable speed means for driving said rotor in opposition to the phase rotation of said multi-phase signal whereby the frequency at said output winding has a small proportional variation as compared with the proportional variation of the variable speed means.

JOSEPH R. SCHOENBAUM.
WILLIAM H. CLARK, Jr.

REFERENCES CITED

The following references are of record in the file of this patent:

UNITED STATES PATENTS

| Number | Name | Date |
|---|---|---|
| 438,602 | Bradley | Oct. 21, 1890 |
| 1,570,347 | Hobart | Jan. 19, 1926 |
| 1,669,577 | Schenkel | May 15, 1928 |
| 1,890,045 | Widmer et al. | Dec. 6, 1932 |
| 2,137,990 | Rossman | Nov. 22, 1938 |
| 2,202,172 | Stoller | May 28, 1940 |

FOREIGN PATENTS

| Number | Country | Date |
|---|---|---|
| 210,097 | Great Britain | Jan. 25, 1924 |
| 471,113 | Great Britain | Aug. 23, 1937 |
| 662,187 | Germany | July 7, 1938 |